Figure 1:
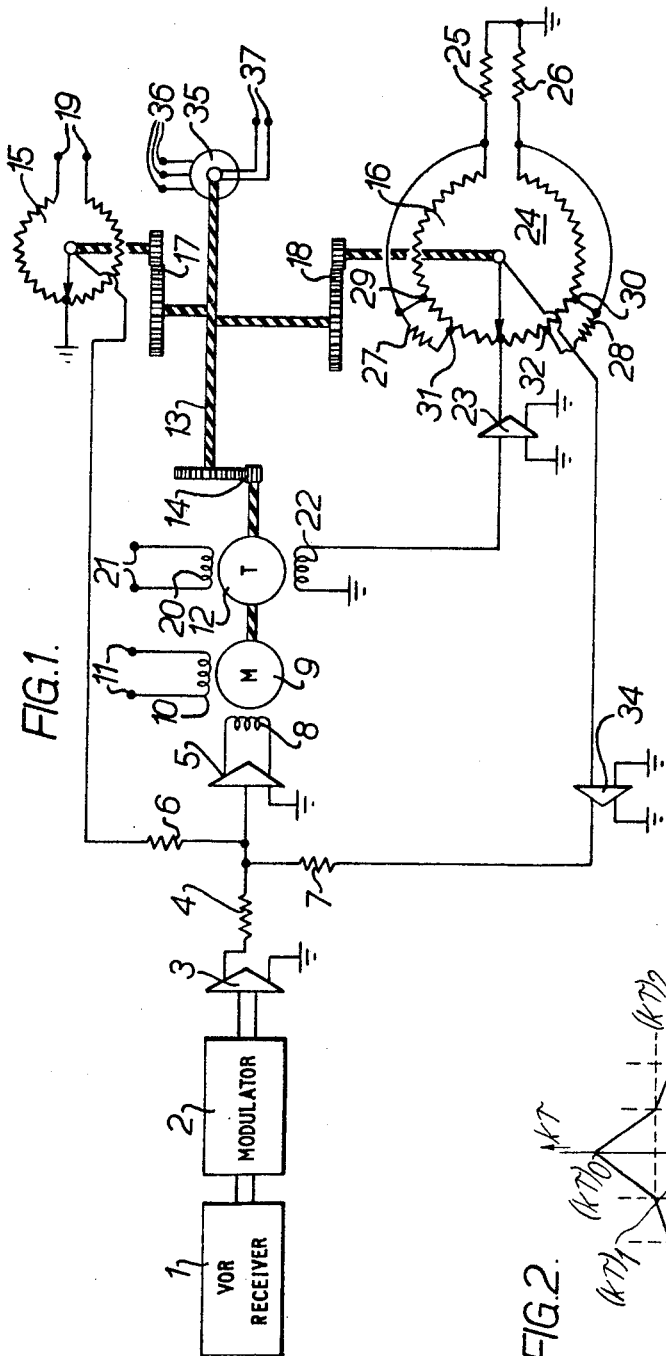

Aug. 30, 1966  D. W. RIGHTON  3,270,344
RADIO NAVIGATION APPARATUS AND FILTERS FOR USE THEREIN
Filed May 31, 1963

David William Righton
by Moore, Hall & Pollock,
attys.

United States Patent Office 3,270,344
Patented August 30, 1966

3,270,344
RADIO NAVIGATION APPARATUS AND FILTERS FOR USE THEREIN
David William Righton, Cheltenham, England, assignor to S. Smith & Sons (England) Limited, London, England
Filed May 31, 1963, Ser. No. 284,522
Claims priority, application Great Britain, June 1, 1962, 21,122/62
10 Claims. (Cl. 343—106)

This invention relates to navigation apparatus and filters for use therein.

The invention is particularly, although not exclusively, concerned with radio navigation apparatus for use in automatic flight control systems for aircraft.

Automatic flight control systems for aircraft often include radio navigation apparatus of the kind adapted to receive a signal from a radio beam transmitted by an external, ground-stationed radio transmitter and to derive in dependence upon the received signal a signal dependent upon the deviation of the aircraft from a predetermined path. The predetermined path may be defined by the beam alone, or by the beam in conjunction with means carried by the aircraft, and the derived signal may be used in the flight system to effect the control of an automatic pilot necessary to bring the aircraft, and then maintain it, on this path.

An example of radio navigation apparatus of the above kind is to be found in the VHF (very high frequency) radio receiver known as a VOR (VHF omni-range) receiver and commonly used in aircraft to receive a signal from the radio beam transmitted by a VOR radio beacon. Such a receiver derives from the received signal a signal dependent upon the angular separation between two of the infinite number of lines, referred to as radials, which may be imagined to radiate in all directions in azimuth from the VOR beacon. The two radials concerned are respectively the radial upon which the aircraft carrying the VOR receiver is positioned and a radial which is selected as the desired flight path, the signal derived by the receiver being dependent in magnitude and sense upon the angular separation between these radials. The angle thus represented is referred to as the "angular deviation" of the aircraft from the selected VOR radial.

It has been found, especially in the case of VOR radio receivers for aircraft, that the "deviation" or displacement-signal derived, includes undesirable noise components, and it has been suggested that these components might be removed in the apparatus by the use of a simple filter of conventional form. However, to be effective against noise such a filter is required to have a time constant, for example of some twenty seconds, which is too long to be acceptable where a craft is being steered in dependence upon the filtered signal. The time lag introduced by the filter in these circumstances may lead to unacceptable overshooting of a selected path for the craft. This has been found to be the case particularly where a VOR system is used and the selected path is intercepted at short range from the VOR beacon.

According to the present invention, in a filter for use in navigation apparatus, input means is adapted to be responsive to an input representation of a variable $\sigma$, and output means is arranged to provide an output representation of a variable $\sigma_f$ that is dependent upon the variable $\sigma$, the arrangement being such that the output representation is substantially in accordance with:

$$\sigma_f = \sigma/(1 + k\tau D)$$

where $D$ is the operator representative of differentiation with respect to time and $k\tau$, which has the dimension of time, is a positive-valued function of $\sigma_f$ the rate of change of $k\tau$ with the modulus of $\sigma_f$ being negative throughout a predetermined range of values of the modulus of $\sigma_f$ extending from zero, and being substantially zero beyond this range.

The rate of change of the function $k\tau$ with the modulus of the variable $\sigma_f$ may change within said range, said rate being more negative for lower values of said modulus than for higher values within said range. The said rate of change may be substantially constant throughout one or more parts of said range.

The said output means may be a rotatable shaft the angular position of which relative to a datum angular position is representative in magnitude and sense of $\sigma_f$. In this case the filter may include a servo system for controlling rotation of the shaft, the servo system being responsive to the input representation of $\sigma$ such as to tend to position the shaft angularly with respect to said datum position in accordance with:

$$\sigma_f = \sigma/(1 + k\tau D)$$

It will be appreciated from the preceding paragraph that the term filter as used in the present specification is not limited to filters of the more conventional form provided by resistance-capacitance networks and providing an electric signal output in response to an electric signal input.

Radio navigation apparatus for use in a craft, for example an aircraft, may comprise a filter in accordance with the present invention, a radio receiver for receiving a radio signal of a radio navigation system and for deriving in dependence upon the received signal a signal dependent upon the deviation of the craft from a predetermined path, and means for supplying the signal derived by the receiver to the filter as the input representation of $\sigma$.

According to a feature of the present invention radio navigation apparatus for use in an aircraft comprises a VOR radio receiver for receiving a signal from a radio beam of a VOR radio navigation system and for deriving in dependence upon the received signal a signal dependent upon angular deviation $\sigma$ of the aircraft from a predetermined VOR radial of said system, and means responsive to the signal dependent upon $\sigma$ to supply an output representation of an angle $\sigma_f$ substantially in accordance with:

$$\sigma_f = \sigma/(1 + k\tau D)$$

where $D$ is the operator representative of differentiation with respect to time and $k\tau$, which has the dimension of time, is a positive-valued function of $\sigma_f$, the rate of change of $k\tau$ with the modulus of $\sigma_f$ being negative throughout a predetermined range of values of the modulus of $\sigma_f$ extending from zero, and being substantially zero beyond this range.

Figure 2:
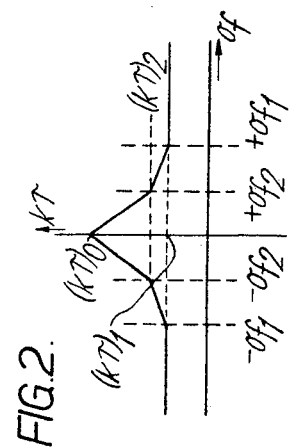

Radio navigation apparatus which includes a filter in accordance with the present invention, and which is for use in an aircraft, will now be described, by way of example, with reference to the accompanying drawing, in which:

FIGURE 1 is a circuit diagram, partly in block schematic form, of the apparatus, and FIGURE 2 is a graph which illustrates a characteristic associated with the operation of the filter.

Referring to FIGURE 1, the radio navigation apparatus includes a VOR radio receiver 1 which is of conventional design in that it is adapted to receive a radio signal transmitted by a ground-stationed VOR radio beacon (not shown), and to derive therefrom a direct current signal which is representative of the angular separation between the radial upon which the aircraft carrying the radio apparatus of FIGURE 1 is positioned, and a radial which is selected by suitable operation of a selector (not shown) of the receiver 1 as a desired flight path of the aircraft. The direct current signal derived by the receiver 1 is representative in magnitude and sense of the angular separation in azimuth of the two radials, and is thereby representative of the angular deviation with respect to the VOR beacon of the aircraft from the desired flight path. The variation in magnitude of the direct current signal with variation in the angular deviation is symmetrical about zero deviation.

The direct current signal derived by the receiver 1 is supplied to a conventional modulator 2 so as to modulate an alternating current carrier signal which has a frequency of 400 cycles per second. The carrier signal is supplied to the modulator 2 from an alternating current source (not shown) that also supplies alternating current of the same frequency to other parts of the radio navigation apparatus (as described later). The modulated signal derived by the modulator 2, which signal has an amplitude and a phasing with respect to the carrier which are dependent respectively upon the magnitude and sense of the signal supplied by the receiver 1, is supplied to a buffer amplifier 3. The amplified signal produced by the amplifier 3 is supplied with respect to earth through a resistor 4 to a star point which is connected directly to an input terminal of a servo amplifier 5 and which is defined by the junction of the resistor 4 with two further resistors 6 and 7. Signals providing position and rate feedback are, as described later, supplied to the star point via the resistors 6 and 7 respectively.

The output signal of the servo amplifier 5 is supplied to energize the control phase winding 8 of a two-phase induction servo motor 9. The reference phase winding 10 of the motor 9 is energized by alternating current of constant amplitude which is supplied to terminals 11 by the above-mentioned alternating current source, and which is in phase quadrature with the carrier signal supplied to the modulator 2. The motor 9 drives a tachometer generator 12 directly, and a shaft 13 via reduction gearing 14. The shaft 13 provides an output shaft of the servo system and is rotated by the motor 9 to have an angular displacement $\sigma_f$ with respect to a datum position, given by:

$$\sigma_f = \sigma/(1+k\tau D)$$

where:

$\sigma$ is the angular deviation represented by the direct current signal supplied by the receiver 1, D is the operator representative of differentiation with respect to time, and $k\tau$ is a non-linear function of $\sigma_f$ having the dimension of time and the form shown in FIGURE 2.

Referring to FIGURE 2, the function $k\tau$ is positive-valued, the rate of change of $k\tau$ with the modulus of $\sigma_f$ being negative throughout the range of the modulus extending from zero to $\sigma_{f1}$, and being substantially zero beyond this range. The graph is symmetrical about ($\sigma_f=0$) so that the value of $k\tau$ for any value of $\sigma_f$ of one sense is the same as that for the same value of $\sigma_f$ of the other sense. In particular, the value of $k\tau$ decreases substantially linearly from $(k\tau)_0$ to $(k\tau)_2$ through ranges of $\sigma_f$ from zero to $+\sigma_{f2}$ and zero to $-\sigma_{f2}$, and substantially linearly, but at a lesser rate, from $(k\tau)_2$ to $(k\tau)_1$ through the ranges of $\sigma_f$ from $+\sigma_{f2}$ to $+\sigma_{f1}$ and $-\sigma_{f2}$ to $-\sigma_{f1}$. The value of $k\tau$ remains substantially constant at $(k\tau)_1$ for any value of $\sigma_f$ which is larger in the positive sense than $+\sigma_{f1}$ and for any value larger in the negative sense than $-\sigma_{f1}$.

Referring again to FIGURE 1, the servo control of the shaft 13 for achieving the above quoted relationship between $\sigma$ and $\sigma_f$, is produced using two variable potentiometers 15 and 16 the wipers of which are driven by the shaft 13 through reduction gearing 17 and 18 respectively. Each potentiometer 15 and 16 has a substantially linear resistance characteristic and has a center-tap on its resistance track, the wiper of the relevant potentiometer being positioned at the center-tap when the angular displacement $\sigma_f$ of the shaft 13 is zero. The center-tap of the potentiometer 15 is connected directly to earth, terminals 19 at the two ends of the resistance track of potentiometer 15 being supplied with respect to earth with two alternating currents which are antiphase with one another. These two alternating currents are supplied to the terminals 19 respectively from the alternating current source referred to above, one being in-phase and the other antiphase with the carrier signal supplied to the modulator 2. The signal which is derived by the wiper of the potentiometer 15 and which is dependent upon the angular displacement $\sigma_f$ of the shaft 13, is supplied through resistor 6 to the servo amplifier 5 as negative feedback of shaft position.

The center-tap of the potentiometer 16 is connected to receive a signal generated by the tachometer generator 12. The tachometer generator 12 has an input winding 20 which is energized by alternating current supplied to terminals 21, this alternating current being supplied from the above-mentioned alternating current source so as to be in-phase with the carrier signal supplied to the modulator 2. The energization of the winding 20 causes a signal to be induced in an output winding 22 of the generator 12, this signal having an amplitude and a phasing with respect to the energizing current which are respectively dependent upon the rate and sense of the motor drive and also, thereby, upon the rate and sense of rotation of the shaft 13. This induced signal is supplied to the center-tap of the potentiometer 16 after amplification by an amplifier 23.

The potentiometer 16 forms part of a resistance network 24 which in addition includes a pair of resistors 25 and 26 of equal resistance value $R_2$, and a pair of resistors 27 and 28 of equal resistance value $R_1$. In addition to its center-tap the potentiometer 16 has four other taps 29 to 32, the taps 29 and 30 occurring on the resistance-track at the symmetrically-placed positions which are respectively occupied by the wiper when the shaft 13 has angular displacements $+\sigma_{f1}$ and $-\sigma_{f1}$. The taps 31 and 32 occur on the resistance-track at the symmetrically-placed positions which are respectively occupied by the wiper when the angular displacements of the shaft 13 are $+\sigma_{f2}$ and $-\sigma_{f2}$. The end sections from the taps 29 and 30 of the two halves of the resistance-track are short-circuited, the two ends of the track being connected to earth via resistors 25 and 26 respectively. The resistors 27 and 28 are connected between the respective pairs of taps 29 and 31 and 30 and 32.

The voltage with respect to earth derived by the wiper of the potentiometer 16 falls from the value, V, applied to the center-tap as the wiper moves in either direction away from the center-tap, the value when the wiper reaches the tap 31 or 32 being $$V(R_2+R_3)/(aR_0+R_2+R_3)$$

where:

$R_0$ is the resistance value of each half of the resistance-track of the potentiometer 16, $a$ is the proportion of the resistance value $R_0$ between the center-tap and each tap 31 and 32, and $R_3$ is the resistance value of the parallel combination of resistances between the taps 31 and 29, and between the taps 32 and 30, this being $bR_0R_1/(bR_0+R_1)$, $b$ being the proportion of the resistance value $R_0$ between taps 31 and 29, and between taps 32 and 30.

The value of the voltage with respect to earth derived by the wiper falls further, but at a reduced rate, as the wiper continues to move away from the center-tap between either the pair of taps 31 and 29 or the pair of taps 32 and 30, the value when the wiper reaches the tap 29 or 30 being $$VR_2/(aR_0+R_2+R_3)$$

The voltage derived by the wiper thereafter remains constant at this latter value for any position further away from center-tap. The resistance characteristic of the network 24 with variation of the angular displacement $\sigma_f$ of the shaft 13 therefore corresponds to the characteristic of FIGURE 2, there being for either sense of rotation of the shaft 13 from the datum position (where $\sigma_f$ is zero) a substantially linear decrease in resistance through a first angular range which is of magnitude $\sigma_{f2}$, a substantially linear decrease in resistance, at a lesser rate compared with the first range, through a second angular range which is of magnitude ($\sigma_{f1}-\sigma_{f2}$), and a substantially constant value of resistance for any angle of magnitude greater than $\sigma_{f1}$.

The signal derived by the wiper of the potentiometer 16 in the network 24 is therefore dependent upon the product of the rate $D\sigma_f$ as represented by the signal derived by the tachometer generator 12, and the function $k\tau$ as represented by the resistance characteristic of the network 24. After amplification by an amplifier 34 the signal derived by the wiper of the potentiometer 16 is supplied through the resistor 7 to the servo amplifier 5 as negative feedback.

The feedback signals ($\sigma_f$ and $k\tau D\sigma_f$) supplied to the servo amplifier 5 through the resistors 6 and 7 respectively are phased with respect to the signal ($\sigma$) supplied through the resistor 4 so that the input signal to the servo amplifier 5 is dependent upon the expression:

$$\sigma - \sigma_f - k\tau D\sigma_f$$

The servo system rotates the shaft 13 so as to tend to maintain this expression equal to zero, that is to say, to tend to maintain the angular displacement $\sigma_f$ of the shaft 13 equal to $$\sigma/(1+k\tau D)$$

The angular position of the shaft 13 therefore provides an output analogue of the angular displacement as acted upon by the transfer function $1/(1+k\tau D)$, the servo system thereby acting as a filter.

In the present case the rotor of a synchro control transformer 35 is driven by the shaft 13. The synchro control transformer 35 has its three-phase stator windings connected to receive signals from three input terminals 36, and its rotor winding connected to pass to two output terminals 37 signals induced from the stator windings.

The transformer 35 is used in the provision of a signal representative of $$C_1(\psi - C_2\sigma_f)$$

where $C_1$ and $C_2$ are constants and $\psi$ is the angular error in the heading of the aircraft from the heading required for a flight-course towards the VOR beacon along the radial selected in the receiver 1. A measure of the heading error $\psi$ is obtained by means of a gyro-magnetic compass (not shown) in the aircraft, such compass including a heading-selector which is set (together with the selector in the receiver 1 to the heading appropriate to flight along the selected radial. The compass also includes a synchro which supplies three output signals which are together representative of the difference $\psi$ between the aircraft heading measured by the compass and the heading selected by the heading-selector. The three signals from the latter synchro are supplied to the terminals 36 so as to excite the stator of the synchro control transformer 35. The signal which is induced in the rotor of the transformer 35 and which appears between the terminals 37 provides the above-mentioned signal representative of $$C_1(\psi - C_2\sigma_f)$$

A signal of the above form is commonly required either alone, or as a component of a more complex signal, in generating a signal demanding aircraft manoeuvres for bringing the aircraft, and maintaining it, on the selected radial. Such a signal may be supplied to an automatic pilot of the aircraft for automatically steering the aircraft, or to a flight director instrument which is adapted to give directions to the human pilot of the aircraft enabling him to effect the appropriate control. In certain applications it is required to include within the demand signal a component dependent upon $D\sigma_f$, and where this is the case such component may be derived from the signal appearing in the winding 22 of the tachometer generator 12. This latter signal may of course be combined with the signal appearing at the terminals 37.

It has been found preferable in practice to have the angle $\sigma_{f1}$ in the characteristic of FIGURE 2 slightly larger, and the angle $\sigma_{f2}$ slightly smaller, than half the angular width of the VOR beam. With one form of radio navigation apparatus constructed as shown in FIGURE 1 the value of $\sigma_{f1}$ is 6.75 degrees and that of $\sigma_{f2}$ is 3.55 degrees, the range of $\sigma_f$ extending to 10 degrees on either side of the zero position. The values of $(k\tau)_0$, $(k\tau)_1$, and $(k\tau)_2$ with this latter apparatus are respectively 20 seconds, 2.1 seconds and 3.8 seconds.

The use in the radio navigation system described above with reference to FIGURE 1, of the filter having the non-linear characteristic involving the function $k\tau$, has distinct advantage over the use of a filter having a linear characteristic especially when the aircraft is required to intercept a VOR radial close to the VOR beacon. With a linear filter there is a lag introduced which results in the aircraft being turned on to the desired radial rather late and this can produce unacceptable overshoots of the radial, in fact, an interception may not be achieved at all. With the use of a filter in accordance with the present invention however, the lags during the initial stages of an interception are reasonably small, the aircraft turning fairly rapidly in the manner required, and the long time constant becomes effective only when the aircraft is virtually established centrally of the VOR beam along the desired radial. This, as confirmed in flight trials, enables interception of a radial to take place at much shorter range than otherwise would be the case.

It will be appreciated that the function $k\tau$ may have a characteristic other than that shown in FIGURE 2. In certain circumstances, in this respect, it may be necessary to use in place of the potentiometer 16, which has a resistance-track with a linear resistance characteristic, a potentiometer having a resistance-track with a non-linear resistance characteristic. Alternatively a non-linear drive from the shaft 13 to a linear resistance network may be employed.

Reference is directed to British Patent No. 984,754 granted to S. Smith & Sons (England) Limited, which includes description of radio navigation apparatus in accordance with the present invention as used in an automatic flight control system of an aircraft. In this case the signal which corresponds to the signal derived by the synchro transformer 35 is used to generate an input demand signal to the aileron channel of an auto pilot.

Where a comprehensive flight control system is used the radio apparatus described above may include in addition to the VOR receiver 1 additional radio receivers such as for example those required for a Doppler radar system, ILS (Instrument Landing System), and a Tacan system. The signals derived by all the radio receivers used in this case may be passed to switching means which supplies them selectively, one at a time and as required, to the modulator 2. In these circumstances however, the non-linear characteristic ($k\tau$) provided by the network 24 is normally required only when the VOR signal $\sigma$ is being supplied to the modulator 2. Switching means (not shown) may be included in the rate feedback loop of the servo system for switching out the network 24 except when the signal derived by the VOR receiver 1 is being supplied to the modulator 2. When the network 24 is switched out of the rate feedback loop the signal appearing in the winding 22 of the tachometer generator 12 as amplified by the amplifier 23 is supplied to the star point (junction of resistors 4, 6 and 7) via a further resistor so that the shaft 13 is then positioned according to:

$$\sigma/(1+\tau D)$$

where $\alpha$ represents the variable appropriate to the signal then being supplied to the modulator 2·$\tau$ is a constant with the dimension of time, and D is the operator representative of differentiation with respect to time.

I claim:

1. In navigation apparatus for a craft, the combination of means for deriving a signal in accordance with displacement $\sigma$ of the craft from a predetermined path, and a filter responsive to said signal to provide an output representation of the value of a variable $\sigma_f$ substantially according to: $\sigma_f = \sigma/(1+k\tau D)$ where D is an operator representative of differentiation with respect to time, and $k\tau$ which has the dimension of time, is a positive-valued function of $\sigma_f$, the rate of change of $k\tau$ with the modulus of $\sigma_f$ being negative throughout a predetermined range of values of the modulus of $\sigma_f$ extending from zero and being substantially zero beyond this range, said filter including means to provide a representation of the rate of change of the output representation of the variable $\sigma_f$, feedback means for providing in said filter negative rate-feedback in accordance with said representation of the rate of change of the variable $\sigma_f$, said feedback means being controllable to vary selectively the degree of negative rate-feedback, and means operatively coupled to the feedback means to control the degree of negative rate-feedback in accordance with the magnitude of said output representation.

2. The combination according to claim 1 wherein the rate of change of the function $k\tau$ with the modulus of the variable $\sigma_f$ changes within said range, said rate being more negative for lower values of said modulus than for higher values within said range.

3. The combination according to claim 2 wherein said rate of change of the function $k\tau$ with the modulus of the variable $\sigma_f$ is substantially constant throughout each of two parts of said range, the value of said rate throughout one of said parts, which part comprises lower values of said modulus than the other, being more negative than the value of said rate throughout the other part.

4. Radio navigation apparatus for use in an aircraft and comprising a V.O.R. radio receiver for receiving a signal from a radio beam of a V.O.R. radio navigation system and for deriving in dependence upon the received signal a signal dependent upon deviation of the craft from a predetermined V.O.R. radial; a filter having input means responsive to an input representation of a variable $\sigma$ and output means for providing an output representation of a variable $\sigma_f$ that is dependent upon the variable $\sigma$ according to:

$$\sigma_f = \sigma/(1+k\tau D)$$

where D is an operator representative of differentiation with respect to time and $k\tau$, which has the dimension of time, is a positive-valued function of $\sigma_f$, the rate of change of $k\tau$ with the modulus of $\sigma_f$ being negative through a predetermined range of values of the modulus of $\sigma_f$ extending from zero, and being substantially zero beyond this range; and means supplying the signal derived by the radio receiver to said input means of the filter as said input representation of $\sigma$; said filter including means to provide a representation of the rate of change of the output representation of the variable $\sigma_f$, feedback means for supplying to said input means of the filter negative rate-feedback in accordance with said representation of the rate of change of the variable $\sigma_f$, said feedback means being controllable to vary selectively the degree of negative rate-feedback, and means operatively coupled to the feedback means to control the degree of negative rate-feedback in accordance with the magnitude of said output representation.

5. Radio navigation apparatus according to claim 4 including a rotatable shaft, and an electrical servo system which is arranged to be responsive to the signal dependent upon $\sigma$ to control rotation of the shaft such that the angular position of the shaft provides in both magnitude and sense said output representation of $\sigma_f$.

6. Radio navigation apparatus according to claim 5 including an electrical device which is coupled mechanically to said shaft for deriving an electric signal dependent upon $\sigma_f$.

7. Radio navigation apparatus according to claim 4 wherein the value of the function $k\tau$ decreases substantially linearly from $(k\tau)_0$ to $(k\tau)_2$ through the ranges of $\sigma_f$ from zero to $+\sigma_{f2}$ and zero to $-\sigma_{f2}$, and substantially linearly, but at a lesser rate, from $(k\tau)_2$ to $(k\tau)_1$ through the ranges of $\sigma_f$ from $+\sigma_{f2}$ to $+\sigma_{f1}$ and $-\sigma_{f2}$ to $-\sigma_{f1}$, the value of $+\sigma_{f1}$ being larger in the positive sense than the value of $+\sigma_{f2}$.

8. In a V.O.R. radio navigation system, radio navigation apparatus according to claim 7 wherein $\sigma_{f1}$ and $\sigma_{f2}$ are angles which are slightly larger and slightly smaller respectively than half the angular width of the V.O.R. radio beam.

9. In navigation apparatus for a craft, the combination of means for deriving a signal representative of displacement $\sigma$ of the craft from a predetermined path, and a servo system responsive to said signal to provide an output representation of the value of a variable $\sigma_f$ substantially according to: $\sigma_f = \sigma/(1+k\tau D)$ where D is an operator representative of differentiation with respect to time, and $k\tau$, which has the dimension of time, is a positive-valued function of $\sigma_f$, the rate of change of $k\tau$ with the modulus of $\sigma_f$ being negative throughout a predetermined range of values of the modulus of $\sigma_f$ extending from zero and being substantially zero beyond this range, said servo system comprising a rotatable shaft, an electrical servo motor that is energizable to rotate the shaft, an electric servo amplifier for energizing the motor in dependence upon said signal representative of craft displacement, first negative feedback means responsive to the rotational position of the shaft to supply to said servo amplifier a negative-feedback electric signal in accordance with angular displacement of said shaft from a datum position, a selectively-variable resistance, second negative feedback means responsive to the rate of rotation of the shaft to supply to said servo amplifier via said selectively-variable resistance a negative-feedback electric signal in accordance with said rate of rotation, and means coupled to said shaft to vary said selectively-variable resistance in accordance with rotation of said shaft in a sense to decrease said resistance with decrease in said angular displacement of the shaft.

10. In an aircraft, radio navigation apparatus including the combination according to claim 9, said means for deriving a signal in accordance with displacement $\sigma$ including a V.O.R. radio receiver for deriving a signal representative of the angular deviation of the aircraft from a predetermined V.O.R. radial.

References Cited by the Examiner

UNITED STATES PATENTS

| | | |
|---|---|---|
| 2,812,485 | 11/1957 | Schieber. |
| 2,881,990 | 4/1959 | Kutzler _____ 244—77 |
| 3,028,534 | 4/1962 | Chilton. |

CHESTER L. JUSTUS, *Primary Examiner.*

H. C. WAMSLEY, *Assistant Examiner.*